United States Patent [19]

Myers

[11] 4,427,160

[45] Jan. 24, 1984

[54] EQUALIZER FOR TAPE TENSION

[75] Inventor: Richard D. Myers, Worcester, Mass.

[73] Assignee: Marathon Products Corporation, Worcester, Mass.

[21] Appl. No.: 389,599

[22] Filed: Jun. 18, 1982

[51] Int. Cl.³ .............................................. G11B 23/10
[52] U.S. Cl. .............................. 242/55.19 A; 360/93
[58] Field of Search ................. 242/55.19 R, 55.19 A, 242/75.1, 75.3, 187, 189, 194; 360/93; 352/128, 78 R

[56] References Cited

U.S. PATENT DOCUMENTS

| | | | |
|---|---|---|---|
| 3,612,430 | 10/1971 | Freeman | 242/189 |
| 4,020,999 | 5/1977 | Camras | 242/55.19 A |
| 4,309,728 | 1/1982 | Takizawa et al. | 242/189 X |

Primary Examiner—Stuart S. Levy
Assistant Examiner—David Werner
Attorney, Agent, or Firm—Charles R. Fay

[57] ABSTRACT

In a tape cartridge, an equalizer for tension in the tape, comprising a unitary oscillatable member having means bearing on the tape at the takeoff area of a reel on a loose hub, and a second means bearing on the tape at the return or feedback area, the tape itself causing oscillation of the equalizer to avoid unequal tension in the tape.

12 Claims, 4 Drawing Figures

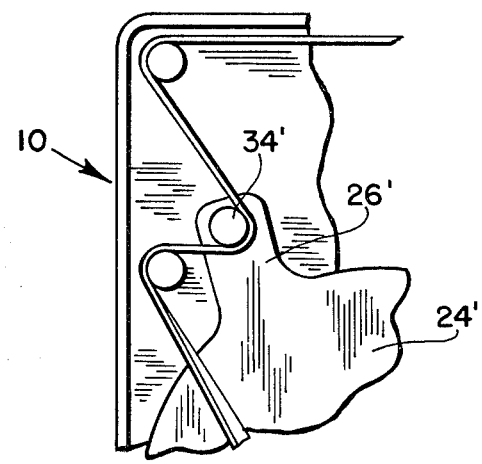
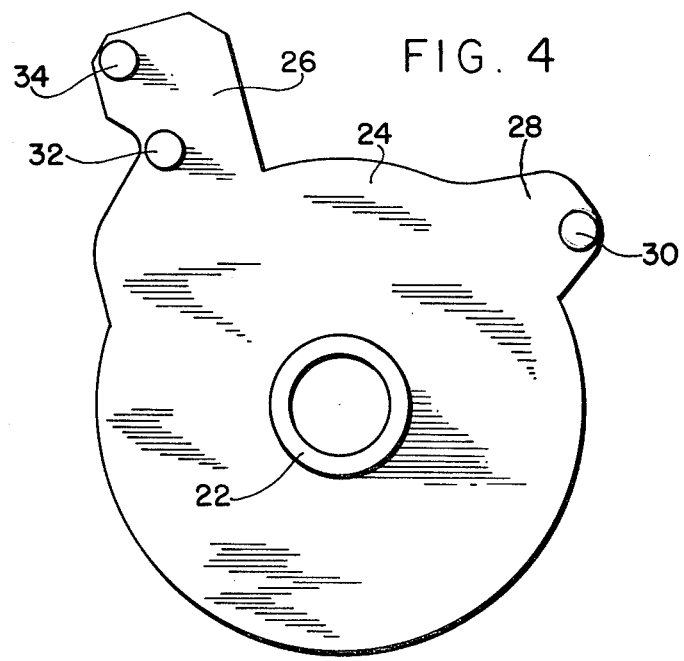

EQUALIZER FOR TAPE TENSION

BACKGROUND OF THE INVENTION

Reference is made to U.S. Pat. No. 3,304,019 which improved the art of tape sound reproduction by eliminating the usual prior art gap or eye in the wound tape formed after continued use and often resulting in malfunction and jamming. These gaps are formed because the endless tape passes from the wound tape at its hub at a slower speed than that of the tape as it feeds back onto the reel at its outer periphery. While the invention disclosed in the patent obviates a deleterious effect of the prior art, the tape still travels faster at the reel periphery than at the hub, this action being inherent, and sometimes resulting in excess "wow" and "flutter". This is caused by unequal tension in the tape at the feedback at the periphery and at the hub of the reel, whereby the tape may at times try to "override" or leave its path at the feedback area, affecting the sound.

SUMMARY OF THE INVENTION

This invention utilizes essentially the same basic structure of the patent and in addition provides a very simple non-spring tape take-up device that equalizes the feedback and take off tape tension whereby the tendency of the tape at the feedback point to bunch up or override is avoided. This, in turn, avoids practically all possible wow and flutter and causes the tape to run easier and more smoothly. This equalizer device is a flat plate of any suitable material as plastic. It has a center hole loosely fitting a circular fixed hub upon which it is smoothly oscillatable. The plate has two generally radially extending circumferentially spaced co-planar ears, each ear having an upstanding pin. In some cases, one ear may have two or more pins, and this ear is located adjacent the feed out area of the reel, the other pin being located adjacent the feedback area. By placing the tape to feed out over a fixed pin and then about its adjacent equalizer pin, thence to the record and play area, then back over another fixed pin and partly about the equalizer pin near the feedback, any excess tension at feedback or at feedout stations act on the oscillatable equalizer to cause pressure to transfer from high to low, and thus equalize. No springs are necessary although feasible because of the fact that the equalizer is a one-piece unit, and it is freely movable under influence of the tape tension.

BRIEF DESCRIPTION OF THE DRAWINGS

FIG. 3 is a detail of a modification;
and
FIG. 4 is a view of the equalizer.

PREFERRED EMBODIMENTS OF THE INVENTION

Figure 2:
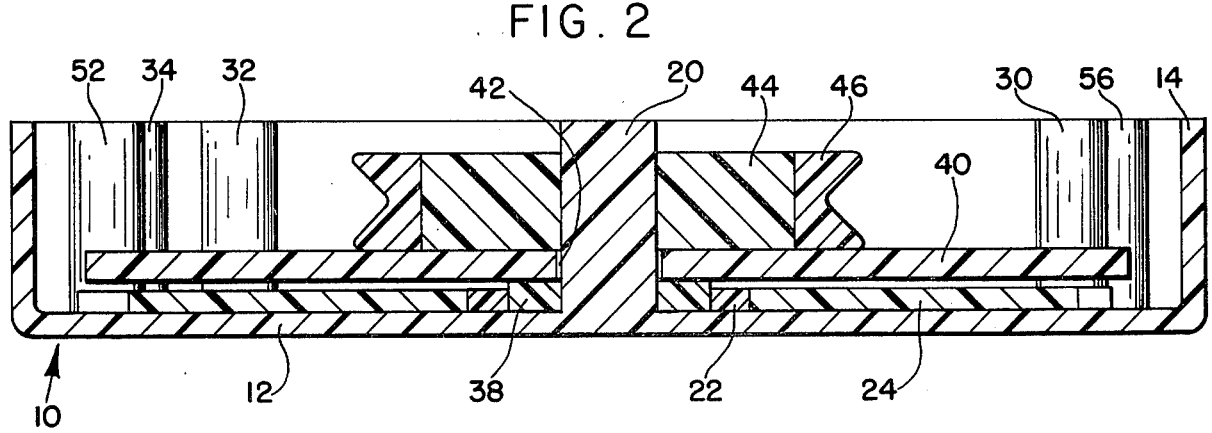
FIG. 2 is a sectional view on line 2—2 of FIG. 1.

The invention is illustrated as applied to a tape cartridge and is generally indicated at 10. It has a plane bottom 12 and a peripheral rim or wall 14. It has an opening 16 for the accommodation of the usual capstan and tape drive roller as well known in the art. It also has openings 18 in a part of the wall for the usual play and record devices, also well known. In a central location, the bottom 12 has an upstanding fixed spindle or the like 20 surrounded by a fixed annular ring 22, FIG. 2, on which is loosely and circumferentially mounted the flat plate 24 that is oscillatable thereon.

Figure 1:
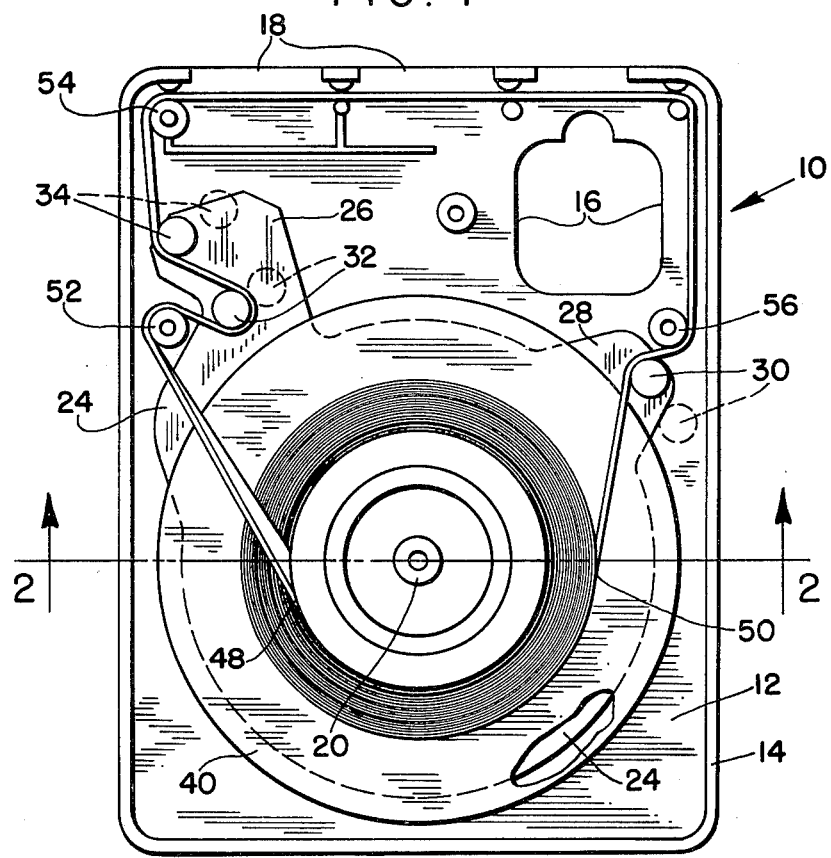
FIG. 1 is a plan view of a cartridge embodying the invention, the cartridge cover being removed.

Flat plate 24 has a pair of circumferentially spaced flat ears 26 and 28 co-planar with plate 24. Ear 28 has a single fixed upright post 30 and, in the case of FIG. 1, ear 26 has a pair of spaced upright posts 32 and 34. In FIG. 3, ear 26' has a single fixed post 36.

The ring 22 may have a bushing 38 to support disc 40 which has a center hole 42 to receive spindle 20, and the hub 44 and free running ring 46 are mounted loosely on disc 40, the spindle 20 extending through the hub. The hub 44 and ring 46 are similar to and function the same as the corresponding parts in U.S. Pat. No. 3,304,019. That is, the tape wound on the ring passes off at the periphery of the hub—see 48, past play and record and driving mechanism, back to the outer periphery of the reel at 50.

The tape take-off leads from the hub, at 48, over a fixed post 52, then under and reverse as to movable post 32, over post 34, thence past fixed post 54, play and record tape driver, past and between fixed post 56 and movable post 30, to the feedback at 50. Should tension in the tape build up at the take-off area, the tape itself will bear on post 32 pulling the entire equalizer in a counter clockwise direction causing post 30 to impinge on the tape to a greater degree, thereby losing tension at the output and increasing it at the feedback. The opposite reaction will take place when called for, and the tape tension will be caused to be uniform, substantially eliminating wow and flutter.

I claim:

1. In a tape or film reel cartridge of the endless self-rewinding type having a spindle wherein the tape or film feeds out from the interior of a reel and feeds back to the reel at the outer periphery thereof,
the improvement comprising spring-free means engaging the feedout area of the tape or film and springless means engaging the feedback area of the tape or film,
a support for both said means, said support comprising a disc on the spindle and being movable according to the tension of the tape or film at the areas engaging the means,
wherein the support and both said means are fixed relative to each other, and the tape is the sole element moving said support and both means.

2. In the tape or film reel cartridge of claim 1, means mounting the support, the support mounting means confining the support to a predetermined path.

3. In the tape or film reel cartridge of claim 2 wherein the support mounting means is circular and the support includes a cooperative circular member, whereby the motion of the support is restricted to oscillatory.

4. In the tape or film reel cartridge of claim 1, the means engaging the tape or film comprises posts.

5. In the tape or film reel cartridge of claim 4, the means engaging the tape or film at the area of feedout comprises a single post.

6. In the tape or film reel cartridge of claim 4, the means engaging the tape or film at the area of feedout comprises a plurality of posts.

7. A device for holding and feeding filament-like material in a reel in endless form and having a generally central spindle comprising,
a freely rotatable reel disc on the spindle and a freely rotatable hub on the disc, the material being wound thereon and having a feedout at the periphery of the disc and a feedback at the outer periphery of the wound material, and movable means engaging the material adjacent the feedout and the feedback areas and equalizing the tension of the material at said areas, said movable means comprising an oscillatory disc on the spindle and a pair of spaced posts fixed to the disc, the material being the sole means for oscillating the movable means and being in contact with both posts.

8. The cartridge of claim 7 including means to restrain the support to an oscillatory motion.

9. The cartridge of claim 8 wherein the support motion restraining means is concentric with respect to the spindle.

10. A device for holding and feeding substantially endless filamentary web-like material comprising:
a spindle, a disc on the spindle,
a free hub associated concentrically with respect to the disc and spindle,
a reel on the spindle concentric with the disc, the filamentary material being wound about the reel,
a freely oscillatable member under the disc,
a pair of spaced posts on the member, the material being substantially in contact with both posts at the sides thereof facing the spindle, the posts being radially arranged relative to the spindle, the member and posts being fixed and in effect forming a single element, the material tending to urge said element clockwise and counterclockwise, thereby equalizing the tension of the material adjacent the posts.

11. The device of claim 10 wherein the posts are radially arranged on the member.

12. The device of claim 10 including a fixed post for each of said first named posts, said fixed posts guiding the material to bear on the first named posts at the aspects thereof that tend to oscillate the member in opposite directions.

* * * * *